Nov. 23, 1965  N. STEIN  3,219,109

CEMENTING OF WELLS IN THE EARTH

Filed Feb. 2, 1962

United States Patent Office 3,219,109
Patented Nov. 23, 1965

3,219,109
CEMENTING OF WELLS IN THE EARTH
Nathan Stein, Dallas, Tex., assignor to Socony Mobil Oil Company, Inc., a corporation of New York
Filed Feb. 2, 1962, Ser. No. 170,589
5 Claims. (Cl. 166—12)

This invention relates to wells drilled into the earth and relates more particularly to a method for treating a well penetrating a subterranean formation containing loose or unconsolidated solid earth material.

Wells are drilled into the earth for various reasons. Probably the greatest number of wells are drilled into the earth for the purpose of recovering fluid materials from subterranean formation. For example, wells are drilled into the earth for the purpose of recovering gaseous and liquid hydrocarbons from a subterranean formation containing these materials. In many subterranean formations containing fluid materials, the materials are under pressure and flow by reason of this pressure from the formation into the well. In other of such subterranean formations, the fluid materials are under no more than the rock pressure, and artificial means are employed to effect flow of the fluid material from the formation into the well. For this purpose, pumps located within the well draw the fluid material from the formation into the well. Also for this purpose, a pressure can be imposed upon the fluid material within the formation by injection of a driving liquid or gas which effects flow of the fluid material into the well.

In many subterranean formations, the solid earth material constituting the formation, or solid earth material contained within the formation, is loose or unconsolidated. This loose or unconsolidated solid earth material tends to move with the fluid material flowing from the formation into the well. As a consequence, the earth formation is depleted of its solid earth material and cavities are formed in the vicinity of the well. With the formation of cavities, collapse and spalling of the well occur. Further, the solid earth material accompanying the fluid material fills the well necessitating cleaning of the well at more or less frequent intervals. Some of the solid earth material will accompany the flowing fluid material through the well to the surface of the earth and separation procedures are required to remove the solid earth material from the fluid material. Additionally, the solid earth material flowing with the fluid material through pumps and other well equipment causes excessive wearing of the equipment necessitating frequent replacement or repair. The effects of the movement of the solid earth material with the fluid material from the formation can be alleviated by the use of liners, gravel packs, screens, or other suitable means. However, the use of these means has been attended with varying degrees of success.

It is an object of this invention to provide a method for minimizing the effects of the presence of unconsolidated solid earth material in a subterranean formation penetrated by a well. It is another object of this invention to minimize movement of unconsolidated solid earth material from a subterranean formation containing a fluid into a well penetrating the formation. It is another object of this invention to reduce the wear on pumps and other equipment contained in a well as a result of flow of solid earth material along with fluid material from a subterranean formation to the well. It is another object of this invention to prevent the formation of cavities in a subterranean formation containing unconsolidated solid earth material upon flow of fluid material from the formation. It is another object of this invention to consolidate loose solid earth material in a subterranean formation in the vicinity of a well penetrating the formation. These and other objects of the invention will become apparent from the following detailed description.

In accordance with the invention, there is introduced into a well penetrating a subterranean formation containing loose, or unconsolidated, solid earth material an aqueous slurry of a solid hydraulic cement, the particles of which solid hydraulic cement are within a selected range of sizes. More specifically, there is introduced into the well a slurry containing water and particles of solid hydraulic cement and at least 95 percent by weight of the particles of the solid hydraulic cement in the slurry are of such size that they will pass through a No. 50 screen but be retained on a No. 200 screen. In a specific embodiment of the invention, the particles of solid hydraulic cement are ground Portland cement clinker.

I have found that an aqueous slurry of particles of solid hydraulic cement having the sizes indicated, upon curing in a well pentrating a subterranean formation, is effective to control movement of loose or unconsolidated solid earth material with flow of fluid material from the formation into the well. The cured cement has a satisfactorily high tensile strength to provide structural strength to the well and the earth formation. Further, the cured cement is permeable to the flow of fluid and its permeability is sufficiently high to permit satisfactory rates of flow of fluid through the cured cement from the formation into the well.

In the practice of the invention, the aqueous slurry of particles of solid hydraulic cement is introduced into the well adjacent to the formation containing unconsolidated solid earth materials by any of the methods heretofore employed for introducing cement into a well. For example, where the well is uncased, the cement may be forced through tubing, or otherwise, to the earth formation and the cement slurry deposited in the well adjacent to the formation. By means of imposition of suitable pressure upon the cement slurry within the well, cement slurry may be forced into the unconsolidated formation. Where the cement slurry is forced into the formation, the cement slurry introduced into the well may be followed by another fluid in order to force all of the cement slurry in the well into the formation and thus leave the well clear of cement. On the other hand, the cement slurry may be permitted to remain in the well and to cure within the well. Subsequently, the cured cement may be drilled from the well. Where the well contains casing, the cement slurry may be injected through tubing, or otherwise, to the bottom of the well and then upwardly through the well within the annular space between the exterior surface of the casing and the interior walls of the well. In either of these cases, a packer may be positioned about the tubing at a point within the well above the formation containing the unconsolidated solid earth material. Similarly, where the formation is not at the bottom of the well, a packer or bridging plug can be positioned within the well just below the formation containing the unconsolidated solid earth material. Where casing has not been perforated prior to the cementing operation, perforating by any suitable means may be effected following curing of the cement slurry, and removal of cement from the well where necessary.

Figure 1:
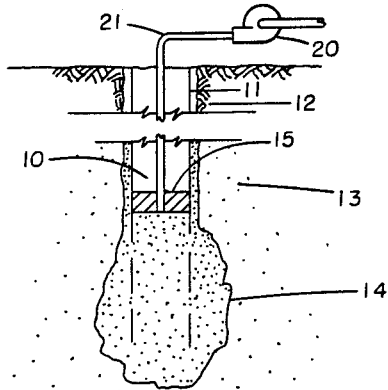
FIGURE 1 is a diagrammatic cross section of a well drilled into the earth and penetrating a subterranean formation containing unconsolidated solid earth material.

Reference will now be made to FIGURE 1 for a more detailed description of a means for treating a well in accordance with the invention. Well 10 is provided with a casing 11. The well penetrates the earth through subterranean formation 12 and subterranean formation 13. Subterranean formation 12 is nonproductive of fluid material to the well and the casing extends through the well below this formation. Subterranean formation 13 is productive of fluid material, such as petroleum oil, and the casing terminates in this formation. Subterranean formation 13 contains unconsolidated solid earth material such as sand. With production of fluid material from the formation into the well a cavernous area 14 is produced within the formation 13 adjacent to the lower end of the well.

In treating the well, a packer 15 is positioned within the well at a point just above the cavernous area 14. An aqueous slurry of solid particles of hydraulic cement of the desired particle size is then prepared. The slurry is pumped by means of pump 20 through tubing 21 extending through the packer 15. The cement slurry flows from the tubing 21 downwardly through the casing and into the cavern 14. The cement, further, flows upwardly through the well between the casing 11 and the wall of the formation 13. Following placing of the cement within the cavern 14, the packer 15 is removed and the cement is permitted to cure. After curing of the cement, the plug of cured cement within the casing may be drilled out. Curing of the cement ordinarily will no longer take place, from a practical standpoint, when production of fluid material from the formation through the cement to the well is effected.

Other methods for introducing cement into a well are disclosed in U.S. Patent No. 2,852,402.

The cured cement is permeable to the flow of fluids from the formation to the well. Thus, the cement permits production of fluids from the formation into the well. Further, the cement, being possessed of tensile strength, resists collapse of the solid unconsolidated earth material surrounding the well and minimizes movement of the earth material into the well from the formation. Thus, the deleterious effect on pumps and other well equipment by movement of solid earth material with flow of fluid from the formation is reduced. Also, cavities, or enlargement thereof, within the subterranean formation do not occur. Additionally, the solid unconsolidated earth material in the formation, where the cement slurry has penetrated into the formation, becomes consolidated.

As indicated, at least 95 percent by weight of the particles of the solid hydraulic cement in the slurry are of such size that they will pass through a No. 50 screen but be retained on a No. 200 screen. Preferably, however, 95 percent by weight of the particles of the solid hydraulic cement are of such size that they will pass through a No. 70 screen and be retained on a No. 100 screen. The screen sizes are those of the United States standard sieve series. The sizes of the particles may also be expressed in terms of equivalent diameters. Thus, the equivalent diameters of the particles of solid hydraulic cement passing through the No. 50 screen and being retained on the No. 200 screen will be between .0029 and .0117 inch. The equivalent diameter of the particles of the hydraulic cement passing through the No. 70 screen and being retained on the No. 100 screen will be between .0059 and .0083 inch.

Portland cement clinker having the desired particle sizes can be prepared from the Portland cement clinker obtained by heating to incipient fusion lime or other calcareous material and clay and shale or other argillaceous material. Ordinarily, this clinker is heated to incipient fusion at temperatures of 1400° to 1500° C. Following heating to incipient fusion, the clinker is cooled. Subsequently, it is ground to the desired particle size. While Portland cement clinker is preferred for use in the invention, other hydraulic cements comprising mixtures of lime, silica, and alumina, or of lime and magnesia, silica and alumina and iron oxide, may be also employed. These include hydraulic limes, grappier cements, pozzolan cements and natural cements.

The compressive strength and the permeability of the cement after curing will vary depending upon the size of the particles of the solid hydraulic cement employed for preparing the aqueous slurry. Further, the permeability and the compressive strength of the cured cement will vary with the curing time and curing temperature of the cement slurry. Accordingly, selection of particle sizes of the solid hydraulic cement can be made to attain a desired permeability and a desired compressive strength. With knowledge of the temperature within the well, and thus the temperature at which the cement will cure, selection of the particle size of the solid hydraulic cement, or curing time, can be made to obtain a desired permeability or compressive strength. Further, a desired permeability and compressive strength can be obtained by control of the temperature of curing of the cement.

Figure 2:
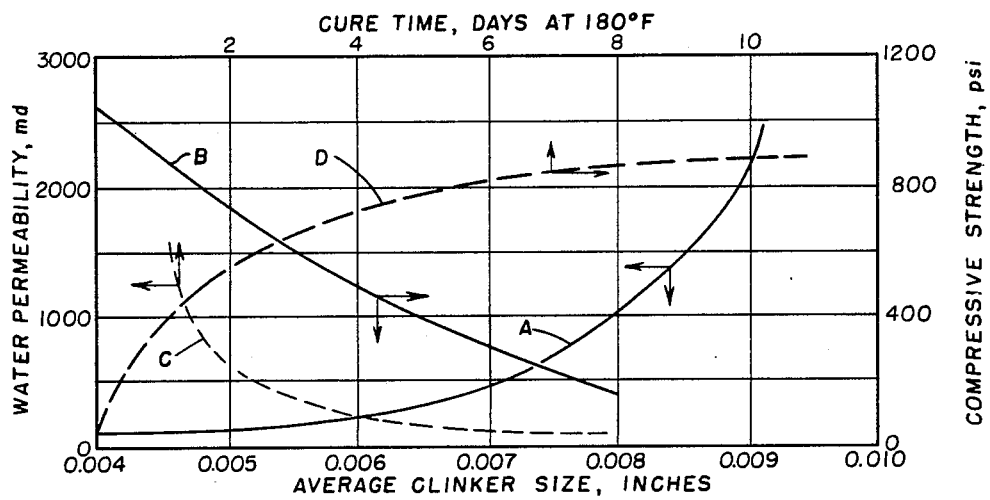
FIGURE 2 is a graph illustrating variation in permeability and compressive strength of cured slurries of Portland cement clinker with particle sizes of the clinker and with time of cure.

Referring now to FIGURE 2, the curve A therein demonstrates the variation in permeability to water of cured cement with the size of the particles of the solid hydraulic cement employed in preparing the slurry. For obtaining the data presented in the curve, Portland cement clinker was employed and slurries thereof were prepared containing a weight ratio of water to cement clinker of 0.4. The cement slurries were cured at atmospheric pressure and at a temperature of 180° F. for 40 hours. Following curing, the permeability of the cement was measured by standard procedures of the API. As will be noted from the curve, with the particles of the Portland cement clinker having tn equivalent diameter of 0.004 inch, the permeability of the cured cement was approximately 100 millidarcies. As the size of the particles of Portland cement clinker increases, the permeability of the curved cement increased. With the particles of the Portland cement clinker having an equivalent diameter of 0.0092 inch, the permeability of the cured cement was approximately 2,500 millidarcies.

Curve B of FIGURE 2 demonstrates the variation in the compressive strength of the cured cement with the size of particles of Portland cement clinker. For obtaining the data presented in this curve, similarly as with curve A, the slurry of the particles of the Portland cement contained a weight ratio of water to cement clinker of 0.4. Also, the cement was cured at 180° F. for 40 hours at atmospheric pressure. Following curing, the compressive strength of the cement was measured by standard procedures of the API. As will be noted from the curve, with the particles of the clinker having an equivalent diameter of 0.004 inch, the compressive strength was of the order of 1,000 pounds per square inch. As the size of the particles of clinker increases, the compressive strength of the cured cement decreased. With particles of the clinker having an equivalent diameter of 0.008 inch, the compressive strength of the cured cement was of the order of 150 pounds per square inch.

Curve C of FIGURE 2 demonstrates the variation in the permeability of cured cement with the time of curing. For obtaining the data presented in this curve, the slurry employed contained a weight ratio of water to cement clinker of 0.4. The particles of the clinker had an equivalent diameter of 0.007 inch. Curing was carried out at 180° F. and at atmospheric pressure. With curing for one day, the permeability of the cured cement was of the order of 1,750 millidarcies. Increase in the time of curing effected a decrease in permeability of the cured cement. With curing for eight days, the permeability was of the order of 100 millidarcies. It will also be noted from curve C that with increase in the cure time, the permeability reaches a minimum level and asymptotically approaches 100 millidarcies.

Curve D of FIGURE 2 demonstrates the variation in the compressive strength of the cured cement with time of curing. For obtaining the data presented in this curve, the slurry contained a weight ratio of water to cement clinker of 0.4. The particles of the clinker had an equivalent diameter of 0.007 inch and curing was carried out at 180° F. and at atmospheric pressure. It will be observed from the curve that the compressive strength of the cured cement increased with time to a value of about 875 pounds per square inch at curing for ten days.

For preparing the curves A, B, C, and D, the same type of Portland cement was employed in each case. Further, the particle sizes indicated are average particle sizes, i.e., the figure obtained by dividing by two the sum of the equivalent diameter of the largest and smallest particles employed for preparing the slurries.

Figure 3:
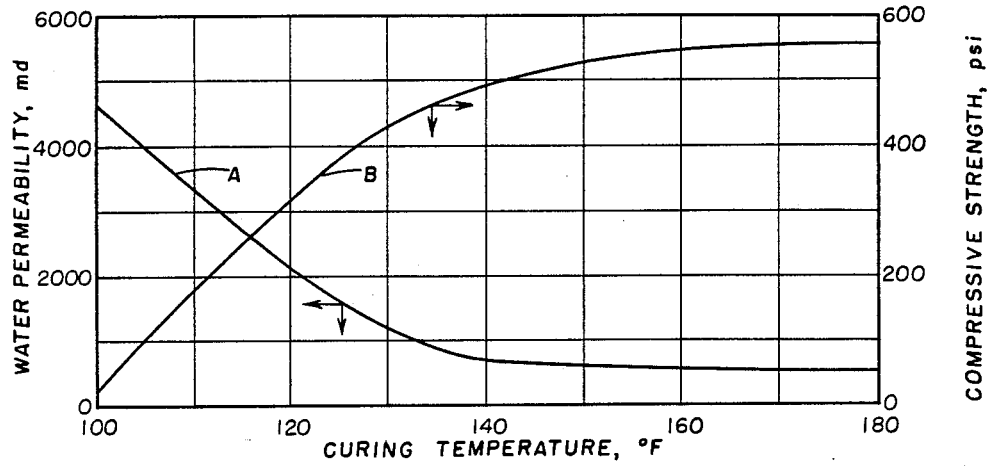
FIGURE 3 is a graph illustrating variation in permeability and compressive strength of cured slurries of Portland cement clinker with temperature of cure.

Reference will now be made to FIGURE 3. In this figure, curve A demonstrates the variation in the permeability to water of cured Portland cement clinker with the temperature of curing. Curve B demonstrates the variation in the compressive strength of cured Portland cement clinker with the temperature of curing. For obtaining the data presented in each curve, the particles of the Portland cement clinker had an equivalent diameter of about 0.007 inch. The particle sizes indicated, similarly as in FIGURE 2, are average particle sizes. Further, the slurry contained a weight ratio of water to cement clinker of 0.4. The Portland cement for preparing each of curves A and B was the same. However, it was not the same Portland cement employed for preparing each of the curves A, B, C, and D of FIGURE 2. Referring to curve A, with a temperature of curing of 100° F., the permeability of the cured cement was approximately 4,500 millidarcies. As the temperature of curing increases, the permeability to water of the cured cement decreased. However, with curing temperatures of 140° F. and above, the water permeability asymptotically approaches 500 millidarcies. Referring to curve B, the compressive strength of the cured cement slurry increases with the temperature of curing. With a temperature of curing of 140° F., the compressive strength is approximately 500 pounds per square inch. As the temperature of curing approaches 180° F., the compressive strength of the cement asymptotically approaches 550 pounds per square inch.

The cured cement in the well adjacent to the formation containing the unconsolidated solid earth material should have a compressive strength of at least about 150 pounds per square inch and a permeability to water of at least about 100 millidarcies. Cured cement having this compressive strength and permeability can be obtained where the particles of Portland cement clinker have an equivalent diameter between .0029 inch and .0117 inch. Expressed in screen sizes, these particles will pass through a No. 50 screen but be retained on a No. 200 screen. Preferably, however, the cured cement should have a compressive strength of 200 pounds per square inch and a permeability to water of 200 millidarcies. Cured cement having this compressive strength and permeability can be obtained where the particles of Portland cement clinker have an equivalent diameter between .0059 and .0083 inch. Expressed in screen sizes, these particles will pass through a No. 70 screen but be retained on a No. 100 screen.

In preparing the aqueous slurry of the particles of solid hydraulic cement, the ratio of water to cement will be that employed ordinarily for preparing aqueous slurries of the hydraulic cement for use in wells. This amount of water, of course, must be such that the slurry of the particles of the hydraulic cement can be pumped or otherwise positioned in the well. Preferably, slurries of particles of Portland cement clinker should contain between about 0.4 and 0.7 part by weight of water per part of cement in order that the slurries be pumpable.

In this connection, the use of excess water will increase pumpability and ordinarily will be of no consequence from the standpoint of the curing of the cement since the excess water can filter from the slurry into the subterranean formation. Mixing of the cement and the water to prepare the slurry may be effected in accordance with the procedures ordinarily employed for preparing cement slurries for use in wells. However, care should be exercised in mixing the particles of the solid hydraulic cement and the water to prevent crushing of the particles of the solid hydraulic cement with resultant change in the amount of the particles having the desired size.

The cement slurry may contain other materials in addition to the water and the particles of solid hydraulic cement. For example, the slurry may contain sand. The amount of sand may be as high as about 0.5 part by weight of sand to one part by weight of the particles of solid hydraulic cement. However, it is preferred that the amount of sand be between about 0.2 and 0.25 part by weight per part of the particles of the solid hydraulic cement. The addition of sand generally decreases the compressive strength of the cured cement. It also increases the permeability of the cement and increases the time required for the cement to attain a given compressive strength for any given temperature of curing. Preferably, the particles of the sand employed should have the same size distribution as the particles of the solid hydraulic cement. Other materials may also be contained in the cement slurry. For example, the cement slurry may contain conventional agents for retarding or accelerating the time required for curing the cement to attain a desired compressive strength.

After positioning of the cement within the well adjacent to the earth formation containing unconsolidated earth material, the slurry is permitted to cure to attain a desired compressive strength and permeability before fluid is produced from the formation. With increase in temperature of the formation, the time required to attain a desired compressive strength will decrease. Thus, at 180° F., curing times of four days ordinarily will prove to be satisfactory. However, longer times may be employed as desired. Where the temperature of the well is less than 140° F., a still longer curing time will be required. On the other hand, the curing time can be decreased by heating the cement slurry prior to placing it in the well. Further, an accelerator for decreasing curing time may be added to the cement slurry, as above mentioned. A suitable accelerator is sodium hydroxide.

Having thus described my invention, it will be understood that such description has been given by way of illustration and example and not by way of limitation, reference for the latter purpose being had to the appended claims.

I claim:
1. A method of treating a subterranean formation penetrated by a well and productive of fluid material to said well which formation contains unconsolidated solid earth material such as sand which moves with said fluid material from said formation to said well, the steps for minimizing the movement of said unconsolidated solid earth material with said fluid material into said well which comprise placing within said well adjacent to and in contact with said subterranean fomation an aqueous slurry of particles of Portland cement clinker, 95 percent by weight of said particles being capable of passing through a No. 50 screen, U.S. standard sieve series, and retained on a No. 200 screen, U.S. standard sieve series, curing said slurry in said well at said position adjacent to and in contact with said formation and forming a permeable cement body having structural strength and permeability to said fluid material in said formation but, which will minimize movement of said unconsolidated solid earth material into said well with said fluid material, said permeable cement body having a water permeability of at least

100 millidarcies, and thereafter producing fluid material from said formation through said permeable cement body to said well.

2. The process of claim 1 wherein 95 percent by weight of the particles of said Portland cement clinker will pass through a No. 70 screen and be retained on a No. 100 screen.

3. The process of claim 1 wherein the particles of Portland cement clinker have an average clinker size of at least about 0.004 inch.

4. The process of claim 1 wherein the aqueous slurry of particles of Portland cement clinker contains between 0.4 and 0.7 part by weight of water to one part by weight of dry Portland cement clinker.

5. The process of claim 1 wherein said permeable cement body has a compressive strength of about 200 pounds per square inch and a permeability to water of about 200 millidarcies.

References Cited by the Examiner
UNITED STATES PATENTS

| | | | |
|---|---|---|---|
| 1,248,455 | 12/1914 | Carson | 106—89 |
| 1,781,267 | 11/1930 | Buhman | 106—89 |
| 3,044,547 | 7/1962 | Jarboe | 166—12 |
| 3,119,448 | 1/1964 | Rhoades | 166—12 |

OTHER REFERENCES

Lea and Desch, "Chemistry of Cement and Concrete," Edward Arnold and Co., London, 1956, pages 18 and 319.

TOBIAS E. LEVOW, *Primary Examiner.*

JOSEPH REBOLD, *Examiner.*